Figure 1:
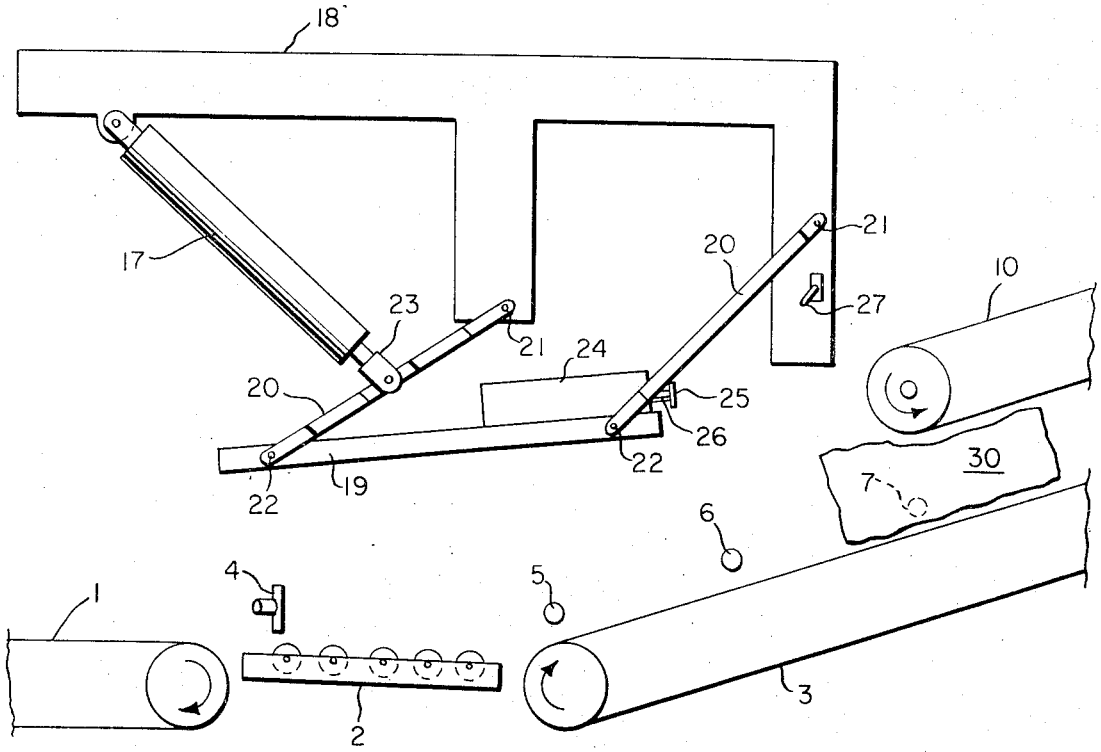
Figure 2:
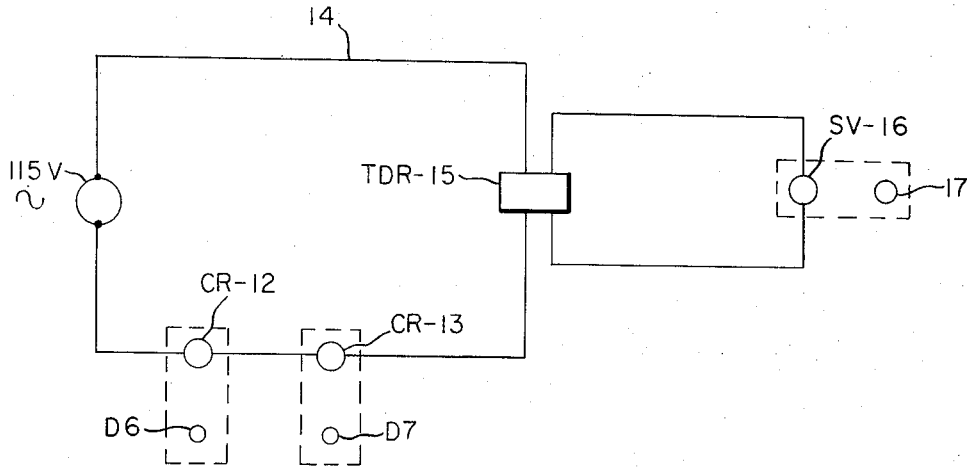

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED JANUARY 1, 1974

918 O.G. 103

T918,002

AUTOMATIC SYSTEM FOR PRINTING INFORMATION ON THE TRAILING END OF CONTINUOUSLY TRANSPORTED ARTICLES

Eugene Edward Knoth, 940 Benston Road, Whitehall, Mich. 49461

Filed Jan. 29, 1973, Ser. No. 327,663
Int. Cl. B41f *17/16, 17/34*
U.S. Cl. 101—41
Sheet Drawing. 13 Pages Specification

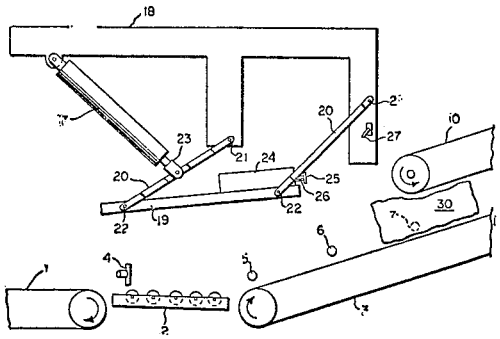

An automatic continuous printing system for printing information on the trailing end of articles as they are transported through the system comprising a conveyor, means to position the articles a predetermined distance apart on the conveyor, a printing carriage reciprocably mounted to assume a printing position and a non-printing position, detecting means to sense conveyance of an article past a predetermined location immediately in advance of the printing carriage, controlling means responsive to the detecting means to position the printing carriage in its printing position a predetermined distance behind the trailing end of an article as it is conveyed, extensible printing means mounted on the printing carriage which automatically advance in the direction of article conveyance to make contact with the trailing end of an article upon positioning of the printing carriage in its printing position, and means to retract the printing means and to return the printing carriage to its non-printing position upon printing of an article. In a preferred embodiment, the article being printed is a bag filled with particulate material and the bag is compressed during printing by a weighted conveyor positioned above the transporting conveyor, thereby forming a firm trailing end to receive printed information such as lot number.

Jan. 1, 1974 E. E. KNOTH T918,002

AUTOMATIC SYSTEM FOR PRINTING INFORMATION ON THE TRAILING END OF CONTINUOUSLY TRANSPORTED ARTICLES

Filed Jan. 29, 1973